United States Patent
Rhodes et al.

(10) Patent No.: US 8,295,764 B2
(45) Date of Patent: Oct. 23, 2012

(54) INDUCTIVE COMMUNICATIONS SYSTEM

(75) Inventors: Mark Rhodes, West Lothian (GB); Brendan Hyland, Edinburgh (GB)

(73) Assignee: WFS Technologies Ltd., Edinburgh (GB)

( * ) Notice: Subject to any disclaimer, the term of this patent is extended or adjusted under 35 U.S.C. 154(b) by 1209 days.

(21) Appl. No.: 12/112,310

(22) Filed: Apr. 30, 2008

(65) Prior Publication Data

US 2009/0170433 A1    Jul. 2, 2009

Related U.S. Application Data

(60) Provisional application No. 61/017,182, filed on Dec. 28, 2007.

(30) Foreign Application Priority Data

Dec. 28, 2007 (GB) .................................. 0725265.3

(51) Int. Cl.
*H04B 5/00* (2006.01)

(52) U.S. Cl. .... 455/41.1; 455/292; 455/41.2; 340/572.8

(58) Field of Classification Search ................ 455/41.1, 455/292, 41.2, 343.1, 522, 574, 127.5; 340/572.8, 340/572.1; 343/895, 866, 867
See application file for complete search history.

(56) References Cited

U.S. PATENT DOCUMENTS

| | | | | |
|---|---|---|---|---|
| 3,758,847 A | * | 9/1973 | Dowling | 324/340 |
| 3,758,848 A | * | 9/1973 | Dowling | 324/340 |
| 5,168,871 A | * | 12/1992 | Grevious | 607/27 |
| 5,541,399 A | * | 7/1996 | de Vall | 235/491 |
| 5,541,574 A | * | 7/1996 | Lowe et al. | 340/447 |
| 5,574,470 A | * | 11/1996 | de Vall | 343/895 |
| 5,608,417 A | * | 3/1997 | de Vall | 343/895 |
| 5,735,887 A | * | 4/1998 | Barreras et al. | 607/60 |
| 6,529,127 B2 | * | 3/2003 | Townsend et al. | 340/505 |
| 6,828,902 B2 | * | 12/2004 | Casden | 340/10.3 |
| 6,870,501 B2 | * | 3/2005 | Beard | 342/45 |
| 7,369,526 B2 | * | 5/2008 | Lechleider et al. | 370/334 |
| 7,911,986 B2 | * | 3/2011 | Kwon et al. | 370/280 |
| 7,936,274 B2 | * | 5/2011 | Shkolnikov et al. | 340/572.8 |
| 2004/0210289 A1 | * | 10/2004 | Wang et al. | 607/116 |
| 2005/0079132 A1 | * | 4/2005 | Wang et al. | 424/1.11 |
| 2009/0033627 A1 | * | 2/2009 | Aasen | 345/168 |
| 2010/0198039 A1 | * | 8/2010 | Towe | 600/373 |
| 2010/0210919 A1 | * | 8/2010 | Ariav et al. | 600/300 |
| 2010/0301840 A1 | * | 12/2010 | Filatov | 324/207.11 |
| 2011/0176479 A1 | * | 7/2011 | Booton et al. | 370/321 |

* cited by examiner

*Primary Examiner* — Minh D Dao

(74) *Attorney, Agent, or Firm* — Paul Davis; Goodwin Procter LLP

(57) ABSTRACT

A bi-directional asymmetric system is provided with a first node and a second node. The first node has a first transmitter that produces a modulated magnetic flux and a first exciter receiver that acts to receive data at the first node. The second node is coupled to the first node with a direct inductive communications downlink and a mutually inductive uplink. The second node includes a receiver that produces a signal induced by the first transmitter at the first node. The second node has a mutually inductive data transmitter that modules an exciter signal produced at the first node by the exciter receiver.

23 Claims, 4 Drawing Sheets

INDUCTIVE COMMUNICATIONS SYSTEM

CROSS-REFERENCE TO RELATED APPLICATIONS

This application claims the benefit of UK application GB0725265.3 filed Dec. 28, 2007 and U.S. Ser. No. 61/017182 filed Dec. 28, 2007 both of which applications are incorporated herein by reference.

BACKGROUND OF THE INVENTION

1. Field of the Invention

The present invention relates generally bidirectional, electromagnetic communications systems, and more particularly to bidirectional electromagnetic communication systems adapted for communication through a partially conductive medium.

2. Description of the Related Art

Magnetic loop communications systems have found niche applications in several areas. In one method of implementing inductive communications a primary coil generates inductive, quasi-static and propagating fields, which induce a voltage in a remote secondary coil. This signal is processed to extract electronic data as a means of implementing a communication link. In these systems the same mechanism is used for the return path of a bidirectional link. And both ends of the link have identical hardware and equal power requirements. This is referred to as a "direct" inductive link.

Some loop antenna communications systems are based on the mutual inductance effect such as Radio Frequency Identification (RFID) systems, and the like. In these systems the primary coil generates a magnetic field that induces a current in a remote secondary coil. This secondary coil current generates a secondary magnetic field, which opposes that of the primary coil according to Lenz's law. Variation of a load impedance across the secondary coil varies the current allowed to flow and hence varies the secondary magnetic flux generated. The concept of mutual inductance describes the effect on a primary coil's impedance due to a coupled secondary coil. Magnetic coupling is weak in the link described here but the effect is still one of mutual inductance. The impedance of the primary coil has some dependence on the current flowing in the secondary. Opposing magnetic flux generated in the secondary reduce the self-generated magnetic field at the primary, which acts to oppose flow of current. In this way the current in the primary is modulated by load variation across the secondary coil and a communication mechanism is established.

RFID systems based on mutual inductance are single directional. The main benefit of these systems is the low power requirement at the data source. The primary coil can be considered as an exciter source since it provides power for the system but does not transmit data. The secondary coil transmits data by modulating its load. Passive RFID tags can be deployed which have no internal power requirements so are not limited by battery life. This class of system is a "mutually inductive" communications link.

There is a need for improved bidirectional communication systems. There is a further need for bidirectional communication systems that have a direct inductive communications downlink and a mutually inductive uplink.

SUMMARY OF THE INVENTION

According, an object of the present invention is to provide improved bi-directional communication systems.

Another object of the present invention is to provide a bidirectional communications system that has a direct inductive communications downlink and a mutually inductive uplink.

Yet another object of the present invention is to provide a bidirectional communications system where the downlink and uplink are at least partially through water and/or through ground.

These and other objects of the present invention are achieved in, a bidirectional asymmetric system that has a first node and a second node. The first node has a first transmitter that produces a modulated magnetic flux and a first exciter receiver that acts to receive data at the first node. The second node is coupled to the first node with a direct inductive communications downlink and a mutually inductive uplink. The second node includes a receiver that produces a signal induced by the first transmitter at the first node. The second node has a mutually inductive data transmitter that modules an exciter signal produced at the first node by the exciter receiver.

DETAILED DESCRIPTION OF THE PREFERRED EMBODIMENTS

Figure 1:
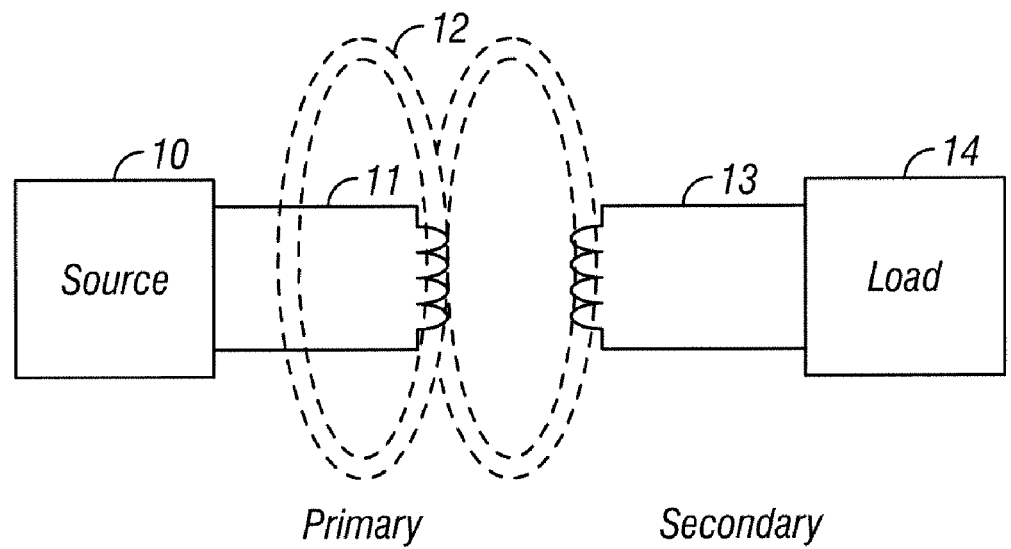
FIG. 1 illustrates one embodiment of main components of a weakly coupled transformer arrangement of the present invention.

In one embodiment of the present invention, electromagnetic communications systems are provided with a direct downlink combined with a mutually inductive up-link, referred to as an "asymmetric" link. FIG. 1 identifies the main components of a weakly coupled transformer arrangement. Source 10 drives a current through the primary loop 11, which generates a magnetic flux represented by field lines 12. Flux couples to secondary coil 13 and induces a current to flow dependent on secondary load 14.

Whenever two coils are located so that the flux from one coil links with the turns of the other coil, a change of flux in one coil causes a potential to be induced across the other coil. This allows energy from one coil to be transferred or coupled to the other coil. The two coils are coupled or linked by the property of mutual inductance (M). The amount of mutual inductance depends on the relative positions of the two coils. If the coils are separated a considerable distance, the amount of flux common to both coils is small and the mutual inductance is low. The mutual inductance of two adjacent coils is dependent upon the physical dimensions of the two coils, the number of turns in each coil, the distance between the two coils, the relative positions of the axes of the two coils, and the permeability of the cores.

Figure 2:
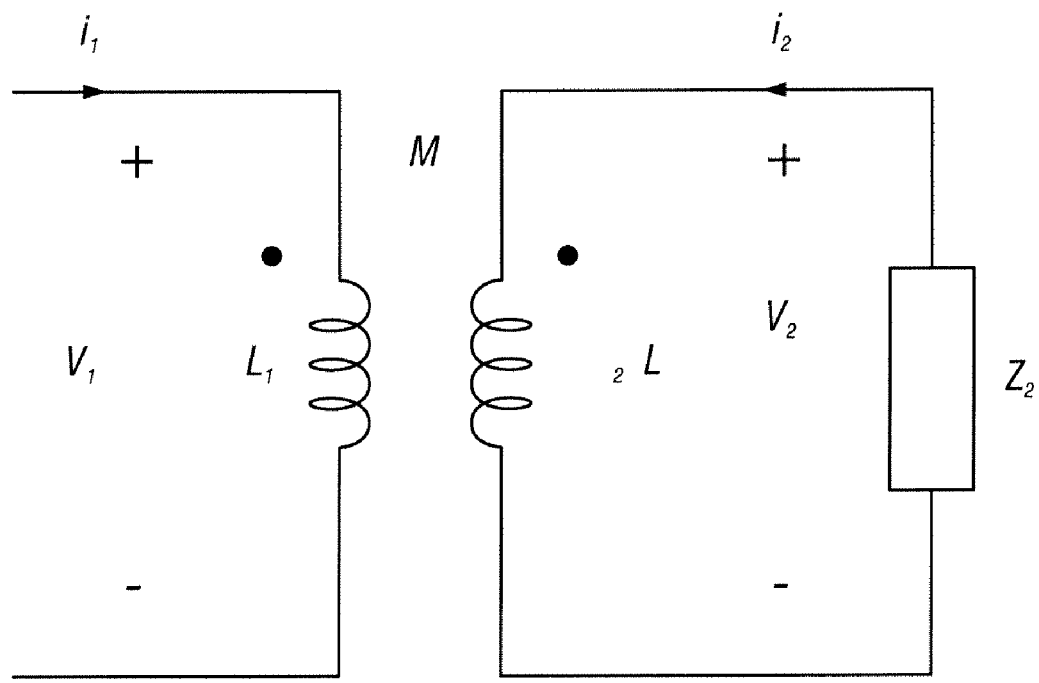
FIG. 2 illustrates and identifies currents and voltages associated with a pair of mutually coupled inductors for one embodiment of the present invention.

The coefficient of coupling between two coils is equal to the ratio of the flux cutting one coil to the flux produced in the other coil. As a non-limiting example, if only 1% of the flux produced by one coil intersects the turns of a second coil, the coefficient of coupling is 0.01. The mutual inductance M between two coils, $L_1$ and $L_2$, is expressed in terms of the inductance of each coil and the coefficient of coupling K:

$$M = K\sqrt{L_1 \cdot L_2} \quad (1)$$

where
mutual inductance in Henry
K=coupling coefficient
L=coild inductance in Henry FIG. 2 illustrates the current "i" created by voltage "v" through inductance "L" and the corresponding parameters in the secondary coil linked through mutual inductance "M". Equation 2 gives the voltage and current relations for the coupled inductors shown in FIG. 2. Equation 2 illustrates the effect on the primary voltage due to mutual inductance increases as we increase the carrier frequency $di_1/dt$ and modulation frequency $di2/dt$. If load $Z_2$ across the secondary coil is modulated this will modulate $i_2$ and hence the voltage $v_1$ across the primary.

$$v_1(t) = L_1 \frac{di_1}{dt} + M \frac{di_2}{dt} \quad (2)$$
$$v_2(t) = M \frac{di_1}{dt} + L_2 \frac{di_2}{dt}$$

Figure 3:
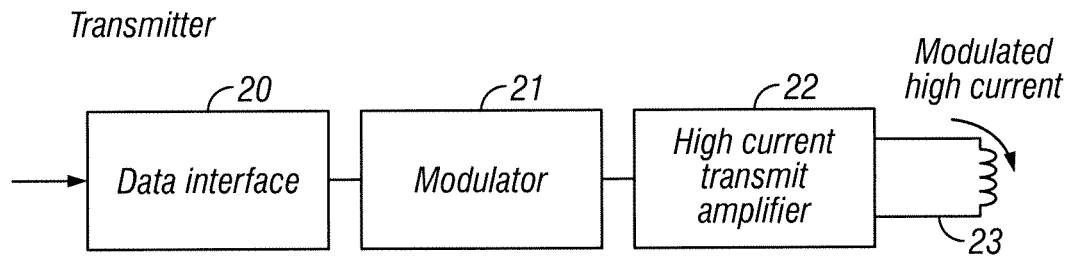
FIG. 3 is a block diagram illustrating one embodiment of a direct transmitter of the present invention.

FIG. 3 illustrates a direct transmitter block diagram. Data interface 20 accepts data from an external data source and formats the data by adding any framing or error correction overhead. Modulator 21 generates a modulated analogue waveform which is amplified by high current transmit amplifier 22 to generate a modulated current in transmit antenna 23.

Figure 4:
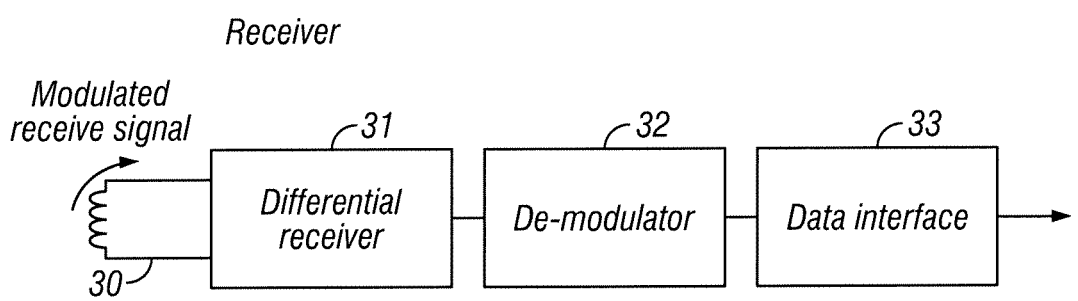
FIG. 4 illustrates one embodiment of a direct receiver block diagram of the present invention.

FIG. 4 illustrates a direct receiver block diagram. A modulated magnetic flux signal induces a modulated receive current in receive antenna 30. This receive current or induced voltage is detected and amplified by differential receive amplifier 31. De-modulator 32 extracts the data stream from the modulated analogue signal and passes the data to the data interface 33. The data interface presents the data in a format useable by external interfaced equipment.

Figure 5:
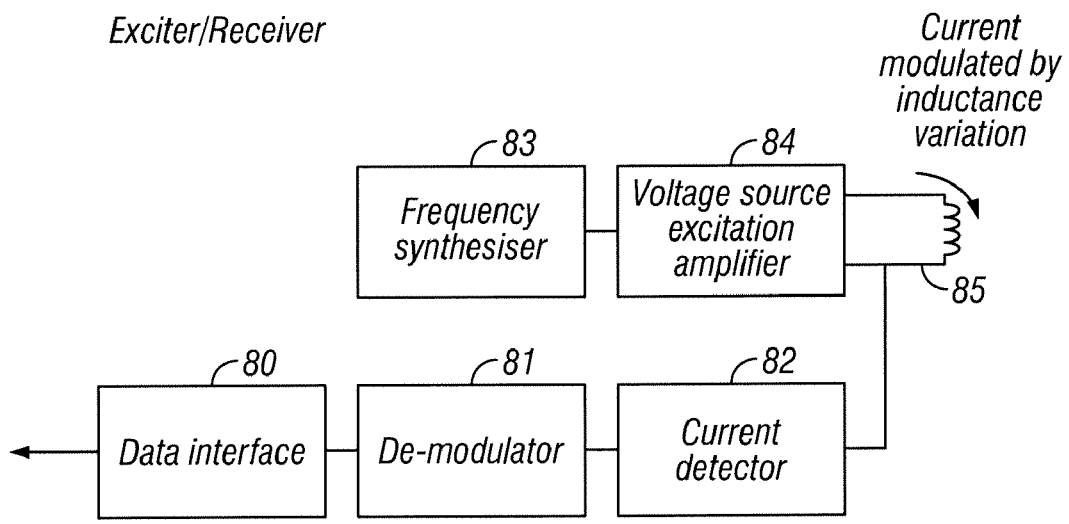
FIG. 5 illustrates one embodiment of a mutually inductive exciter/receiver block diagram of the present invention.

FIG. 5 illustrates a mutually inductive exciter/receiver block diagram. Frequency synthesiser 83 generates a carrier frequency that is amplified by excitation amplifier 84 to produce a current in loop antenna 85. In this non-limiting example of a voltage source exciter, the secondary coil communicates by producing a modulated current in antenna 85, which is detected by current detector 82. De-modulator 81 then extracts a data stream from the modulated current that is passed to data interface 80. The data interface presents the data in a format useable by external interfaced equipment. In some implementations de-modulator 81 contains frequency discriminating filter components to achieve separation of the exciter signal from the modulation signal.

Figure 6:
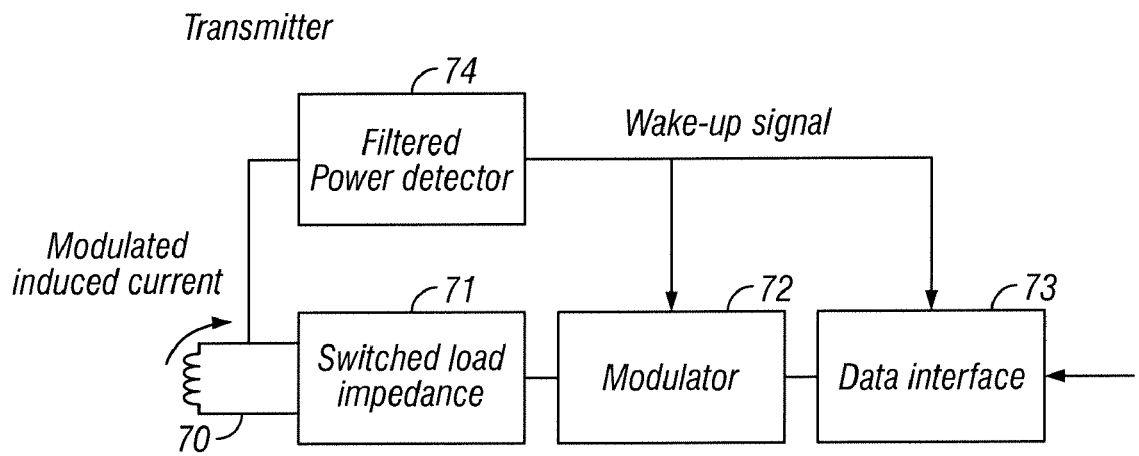
FIG. 6 illustrates one embodiment of a mutually inductive data transmitter block diagram of the present invention.

FIG. 6 illustrates a mutually inductive data transmitter block diagram. Data interface 73 accepts data from an external data source and formats the data by adding any framing or error correction overhead. Modulator 72 provides a control signal to switched load impedance 71 which produces amplitude modulated induced current in antenna 70. This current generates flux in opposition to the excitation flux so ultimately modulating the exciter coil impedance as a means of communication. The system can stand-by in a low power mode with only filtered power detector circuit 74 activated. When it detects the presence of an exciter signal this circuit produces a wake up signal to power up the other components of the data transmitter.

A mutually inductive link can be explained in terms of current induced in a secondary coil producing flux that modulates the inductance of the primary. If the excitation field is generated at frequency $F_1$ and the secondary impedance is modulated at frequency $F_2$ the current in the primary coil has a modulated sideband at frequency $F_1-F_2$. In one possible implementation the detected signal may be filtered to separate the large excitation signal from the much smaller modulated signal sideband. This sideband is then de-modulated to extract the communications data.

Figure 7:
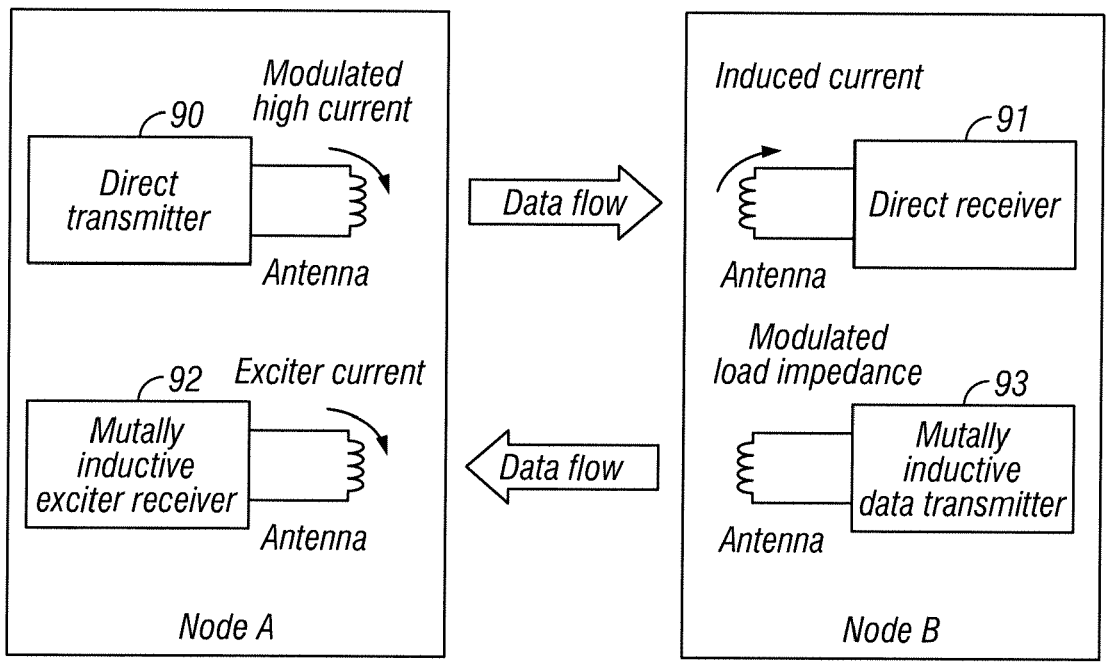
FIG. 7 illustrates a block diagram of one embodiment of a bidirectional asymmetric system of the present invention.

FIG. 7 illustrates a bidirectional asymmetric system block diagram of the present invention. Direct transmitter 90 at node A generates modulated magnetic flux that induces a signal at the remote direct receiver 91 at node B. Node B uses a mutually inductive data transmitter 93 to modulate the exciter signal generated at node A by the exciter/receiver 92. Exciter/receiver 92 acts to receive data at node A. This system implements a bi-directional data link. Typically the system provides half duplex operation with data flow directions separated in time although the system can be switched rapidly to present full duplex capability to the user. In this system node A has a high current, high power requirement for transmit and receive modes. Node B has low power requirements in both modes of operation.

Figure 8:
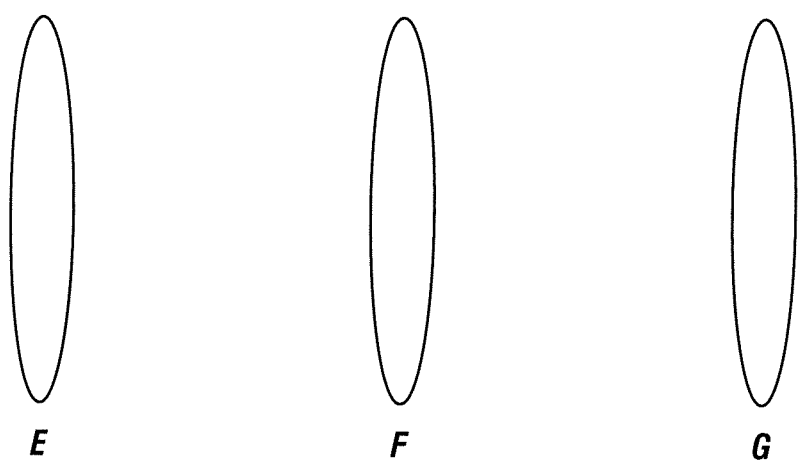
FIG. 8 illustrates three possible coil positions that can be used with the present invention.

FIG. 8 defines three possible coil positions E, F and G that can be used with the present invention. The implementations described above envisage a link consisting of an exciter coil and direct transmitter at position E coupled to a direct receiver and mutually inductive transmitter at position F. A receive coil at position E sees the full driving current of the exciter coil and the mutually inductive receive circuit must be able to detect the small modulated component in the presence of the large exciter current. In one possible alternative implementation the mutually inductive receiver coil may instead be located at position G. This system geometry has the advantage of reducing the dynamic range seen at the receiver. If the receive coil is sited at position G for an exciter at position E and modulating transmitter at F the received exciter signal is many times smaller while the modulated signal remains the same and the dynamic range issue is much easier to process. More generally, the mutually inductive receive coil is positioned so that the flux received from the exciter coil is smaller than the flux received by the secondary modulated coil Many modulation schemes well known in the field of communications theory are suitable for implementing data communications over the presently described system, for example, amplitude modulation, which can be generated by modulating the load magnitude, or phase modulation, which can implemented by modulating the reactive impedance of the secondary coil load.

In one implementation, node A may represent a mobile underwater vehicle that periodically visits a remotely deployed sensor, node B, to recover data. Node A can be serviced between missions and internal batteries re-charged while node B has an extended deployment time due to the low power requirements of this communications method. In another implementation, remotely deployed sensor B can stand-by in a very low power consumption mode but be accessible for initiating communications from node A. For example, node B can run in a low power mode, which detects the presence of power above the noise floor at a pre-determined exciter frequency. This detector then wakes up the mutually inductive load modulator circuit, which sends back an acknowledgment signal to initiate communications with node A.

Where magnetic flux is present in a conductive medium a current is induced in the medium between primary and secondary. This mechanism transfers energy from the magnetic field to current in the water. In a partially conductive medium, for example seawater, attenuation of the magnetic field increases rapidly with frequency. For a conductive medium it is beneficial to operate an inductive communications link, as described by this invention, at a low carrier frequency. However, magnetic noise tends to increase with decreasing frequency so for a conductive medium there is a trade off between lower link loss and higher magnetic noise floor as we decrease operational frequency. The final optimum operating frequency of each system is defined by its individual bandwidth requirements and noise considerations. In one example, a 100 bps system may operate at a 200 Hz carrier frequency in typical seawater with a conductivity of 4 S/m. However, the present system may be applied over quite small through water distances and in these cases a relatively high carrier frequency can be accommodated. For example, a 100 MHz carrier could be used to support a 100 Mbps through sea water link over a range of a few cm.

Attenuation of electromagnetic signals in through-ground applications is also largely due to the conductivity of the ground material and is strongly influenced by the water content of the ground. The systems described here may also be beneficially applied to through ground communications applications.

The asymmetric system of the present invention has several benefits over an alternative bidirectional symmetrical system. As a non-limiting example, node B has very low power consumption requirements in both transmit and receive. This node is ideal for remotely deployed equipment where deployment time is directly related to power consumption through limited battery capacity. Also, all high power requirements are at node A and this is consistent with many applications where one half of the link is periodically recovered for re-charging or directly wired to a higher capacity platform.

In an asymmetric system, as in the present invention, optimal transmit and receive coils have the same requirements and can be shared. At node A the coils both need to generate large magnetic flux by passing high current. For the direct mode the current is modulated and for the mutually inductive exciter, current is not modulated. #In both cases a large area, open cored loop design is optimal. #At node B the mutually inductive load coil and direct receiver both carry very small-induced currents so both benefit from a high permeability core. A long solenoid antenna, with high aspect ratio, wound around a high permeability core is often optimal at node B for both direct receiver and mutually inductive transmitter. These considerations also lead to a compact antenna design in the remotely deployed node B, which is often desirable.

In comparison, in a symmetrical link the antenna requirements are conflicting between transmit and receive functions. A high permeability material such as ferrite can be very usefully deployed to maximise the field strength in a receive coil. However, in transmit ferrite materials are quickly saturated by elevated magnetic field strength so ferrite materials are detrimental.

It will be appreciated that the foregoing is but one possible example of the principle according to this invention. In particular, to achieve some or most of the advantages of this invention, practical implementations may not necessarily be exactly as exemplified and can include variations within the scope of the invention. For example, the direct receiver of FIG. 4 may be used to wake up the mutually inductive transmitter or the system may not make use of a low power standby mode at all. It will be appreciated The systems and methods of the present invention are generally applicable to seawater, fresh water and any brackish composition in between, because relatively pure fresh water environments exhibit different electromagnetic propagation properties from saline, seawater, different operating conditions may be needed in different environments. Any optimisation required for specific saline constitutions are easily determined. Additionally, aspects of this invention are equally applicable to underground applications where transmission loss is also due to the partially conductive nature of the medium. Accordingly the above description of the specific embodiment is made by way of example only and not for the purposes of limitation.

The invention claimed is:

1. A bi-directional asymmetric system, comprising:
a first node with a first transmitter that produces a modulated magnetic flux and a first exciter receiver that acts to receive data at the first node; and
a second node coupled to the first node with a direct inductive communications downlink and a mutually inductive uplink, the second node including a receiver that produces a signal induced by the first transmitter at the first node, the second node having a mutually inductive data transmitter that modules an exciter signal produced at the first node by the exciter receiver.

2. The system of claim 1, wherein the system provides half duplex operation with data flow directions separated in time.

3. The system of claim 1, wherein the system provides full duplex operation.

4. The system of claim 1, wherein the first node has a high current, high power requirement for transmit and receive modes.

5. The system of claim 4, wherein the second node has low power requirements.

6. The system of claim 1, wherein the first and second nodes are coupled with a bi-directional data link.

7. The system of claim 1, wherein the downlink and uplink are at least partially through at least one of water and through ground.

8. The system of claim 1, wherein the transceiver incorporates a direct inductive receiver and a mutually inductive transmitter.

9. The system of claim 1, wherein the transceiver incorporates a direct inductive transmitter and a mutually inductive receiver.

10. The system of claim 1, wherein one end of the downlink and one end of the uplink is in a mobile underwater vehicle.

11. The system of claim 1, wherein one end of the downlink and one end of the uplink is in a remotely deployed sensor.

12. The system of claim 1, wherein one end of the downlink and one end of the uplink are below water while the other is above water.

13. The system of claim 1, wherein one end of the downlink and one end of the uplink are below ground while the other is above ground.

14. The system of claim 1, wherein the mutually inductive exciter and direct transmitter operate with an open cored loop transducer.

15. The system of claim 1, wherein the mutually inductive transmitter and direct receiver operate with a solenoid transducer wound around a high permeability, low conductivity material.

16. The system of claim 1, wherein the system is operable to use carrier frequencies below 100 MHz.

17. The system of claim 1, wherein the inductive uplink is configured to be operable to wait in a low power mode and wake up on detection of a received signal.

18. The system of claim 1, wherein the mutually inductive uplink includes an exciter coil; a receiver coil and a transmitter coil, the exciter coil being operable to excite the transmitter coil to provide it with sufficient power to allow generation of a signal for transmission to the receiver coil.

19. The system of claim 18, wherein a single coil is provided to act as both the exciter and receiver coils.

20. The system of claim 18, wherein the exciter coil and the receiver coil are separate.

21. The system of claim 18, wherein the transmitter coil is positioned between the exciter coil and the receiver coil.

22. The system of claim 18, wherein the exciter coil and the receiver coil are positioned so that flux due to the exciter coil is less at the receiver coil than at the transmitter coil.

23. The system of claim 18, wherein the exciter coil and the receiver coil are positioned equidistant from the transmitter coil.

* * * * *